US006650065B1

(12) United States Patent
Shieh

(10) Patent No.: US 6,650,065 B1
(45) Date of Patent: Nov. 18, 2003

(54) DECORATIVE BULB UNIT WITH FILAMENT SHUNT MOUNTED IN BULB SOCKET THEREOF

(76) Inventor: Whiter Shieh, 6F, No. 245, Tun Hua South Road, Sec. 1, Taipei 106 (TW)

( * ) Notice: Subject to any disclaimer, the term of this patent is extended or adjusted under 35 U.S.C. 154(b) by 0 days.

(21) Appl. No.: 10/151,848

(22) Filed: May 22, 2002

(51) Int. Cl.[7] ................................................ H04B 37/00

(52) U.S. Cl. ............................... 315/185 R; 315/185 S; 315/122; 315/123; 315/125

(58) Field of Search ................................ 315/122, 123, 315/125, 185 R, 185 S, 75, 225, 226, 56, 58

(56) References Cited

U.S. PATENT DOCUMENTS 4,727,449 A * 2/1988 Fleck .......................... 361/54
5,453,664 A * 9/1995 Harris .................... 315/185 S
6,084,357 A * 7/2000 Janning ...................... 315/122
6,323,597 B1 * 11/2001 Janning .................. 315/185 S

* cited by examiner

*Primary Examiner*—Haissa Philogene
(74) *Attorney, Agent, or Firm*—Rosenberg, Klein & Lee

(57) ABSTRACT

A light string includes electrical wires to which a number of bulb sockets are connected in series. Each bulb socket defines a receptacle for receiving and retaining a bulb with the bulb in electrical connection with the electrical wires. A shunt member made of alumina is incorporated in the socket. The shunt member is removably disposed in the receptacle of the socket, independent of the bulb, for being electrically connected to the electrical wires in parallel with the bulb whereby when the bulb burns out, the shunt member maintains the current flowing through the wires. The shunt member further includes an insulation sheath surrounding the alumina section.

6 Claims, 5 Drawing Sheets

DECORATIVE BULB UNIT WITH FILAMENT SHUNT MOUNTED IN BULB SOCKET THEREOF

BACKGROUND OF THE INVENTION

1. Field of the Invention

The present invention relates generally to a decorative bulb unit, and more particularly to a decorative bulb unit with a filament shunt member mounted in the bulb socket thereof.

2. Description of the Prior Art

Decorative light strings are commonly used in celebrations and festivals. The light string usually comprises a number of bulb sockets connected in series to an electric wire. Bulbs, usually incandescent ones, are mounted to the bulb sockets for connection with the wires. When a single bulb fails to illuminate, the whole string fails to light. It is very time-consuming to locate and replace the defective bulb. Thus, light strings with shunt circuits for overcoming the problems are known, such as U.S. Pat. Nos. 6,084,357 and 6,323,597 B1. These conventional designs of shunt circuits, however, require a shunt member to be encased in the bulb itself or are made with expensive electrical elements. The manufacturing process is also complicated.

Thus, it is desired to have a shunt circuit for a light string to alleviate the problem.

SUMMARY OF THE INVENTION

A primary object of the present invention is to provide a decorative bulb unit with a filament shunt member. The shunt member is mounted in the bulb socket of the decorative bulb unit and electrically connected with the filament of the bulb in parallel.

The other object of the present invention is to provide a fight string having a shunt circuit for each bulb of the light string to avoid defective bulbs causing malfunction of the whole light string. The shunt member having a simple structure and low costs of material and manufacturing.

Another object of the present invention is to provide a light string comprising a shunt circuit for each bulb, the shunt circuit being formed easily with a simplified manufacturing process.

A further object of the present invention is to provide a shunt circuit for a light string, the shunt circuit being operative with regular bulbs whereby costs are reduced.

To achieve the above objects, in accordance with the present invention, there is provided a light string comprising electrical wires to which a number of bulb sockets are connected in series. Each bulb socket defines a receptacle for receiving and retaining a bulb with the bulb in electrical connection with the electrical wires. A shunt circuit is incorporated in the socket, including a shunt member made of alumina. The shunt member is removably disposed in the receptacle of the socket, independent of the bulb, for being electrically connected to the electrical wires in parallel with the bulb whereby when the bulb burns out, the shunt member maintains the current flowing through the wires. The shunt member may further include an insulation sheath surrounding the alumina section.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
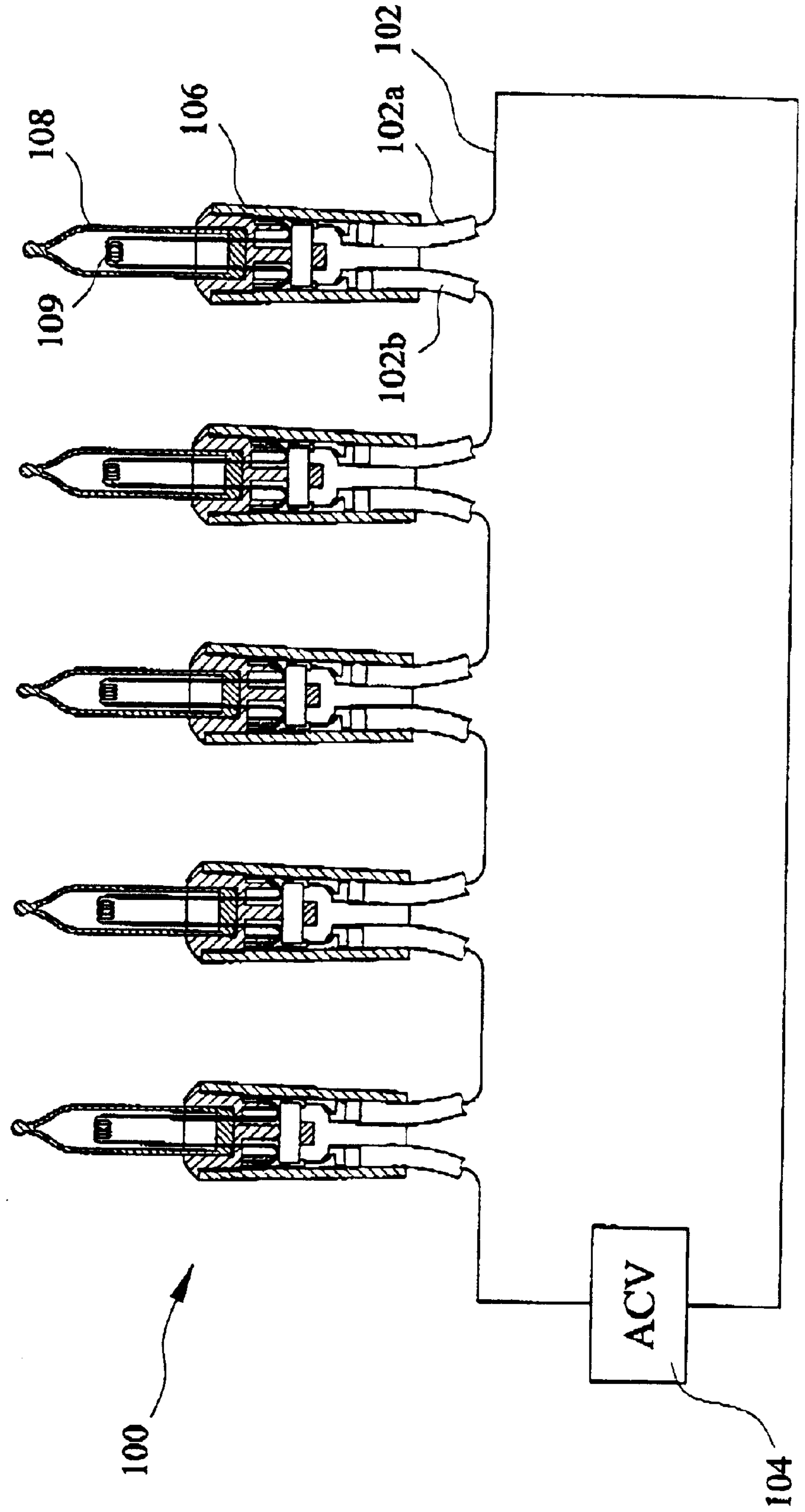
FIG. 1 is a schematic view of a light string incorporating a shunt circuit in accordance with the present invention.

With reference to the drawings and in particular to FIG. 1, a light string, generally designated with reference numeral 100, comprises electrical wires 102 connected to a power source device 104. A number of bulb sockets 106 are mounted to and in electrical connection with the electrical wires 102 via a first connection wire 102*a* and a second connection wire 102*b*. Each bulb socket 106 receives and releasably retains a bulb 108 therein whereby the bulb 108 is electrically connected to the wires 102 and powered by the power source device 104 to illuminate.

Figure 2:
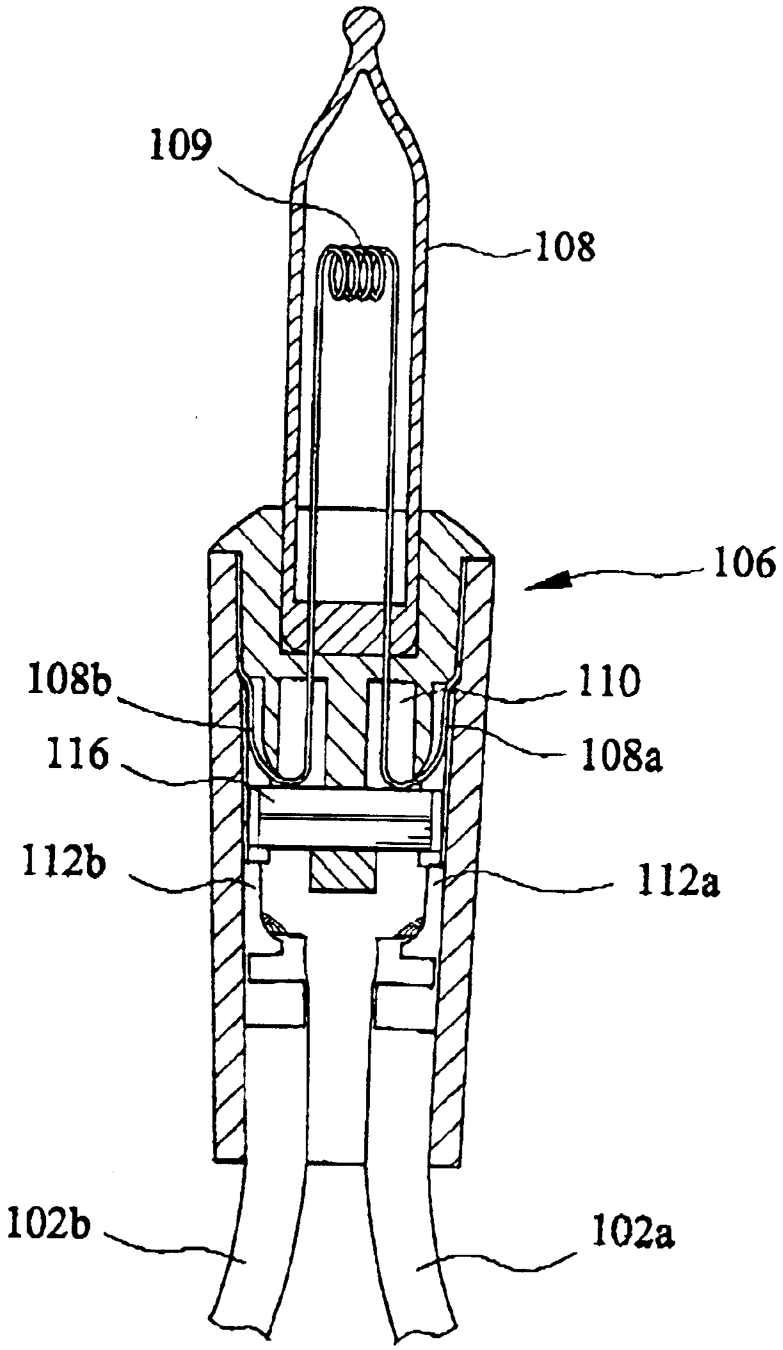
FIG. 2 is a cross-sectional view of a bulb socket of the light string with a bulb received therein.

Also referring to FIG. 2, each bulb socket 106 forms a receptacle 110 in which first and second contacts 112*a,* 112*b* that are electrically connected to the first connection wire 102*a* and the second connection wire 102*b* are fixed. The bulb 108 with a filament 109 is provided with a first terminal 108*a* and a second terminal 108*b* respectively engaging the first and second contacts 112*a,* 112*b* when the bulb 108 is mounted and received in the receptacle 110.

Figure 3:
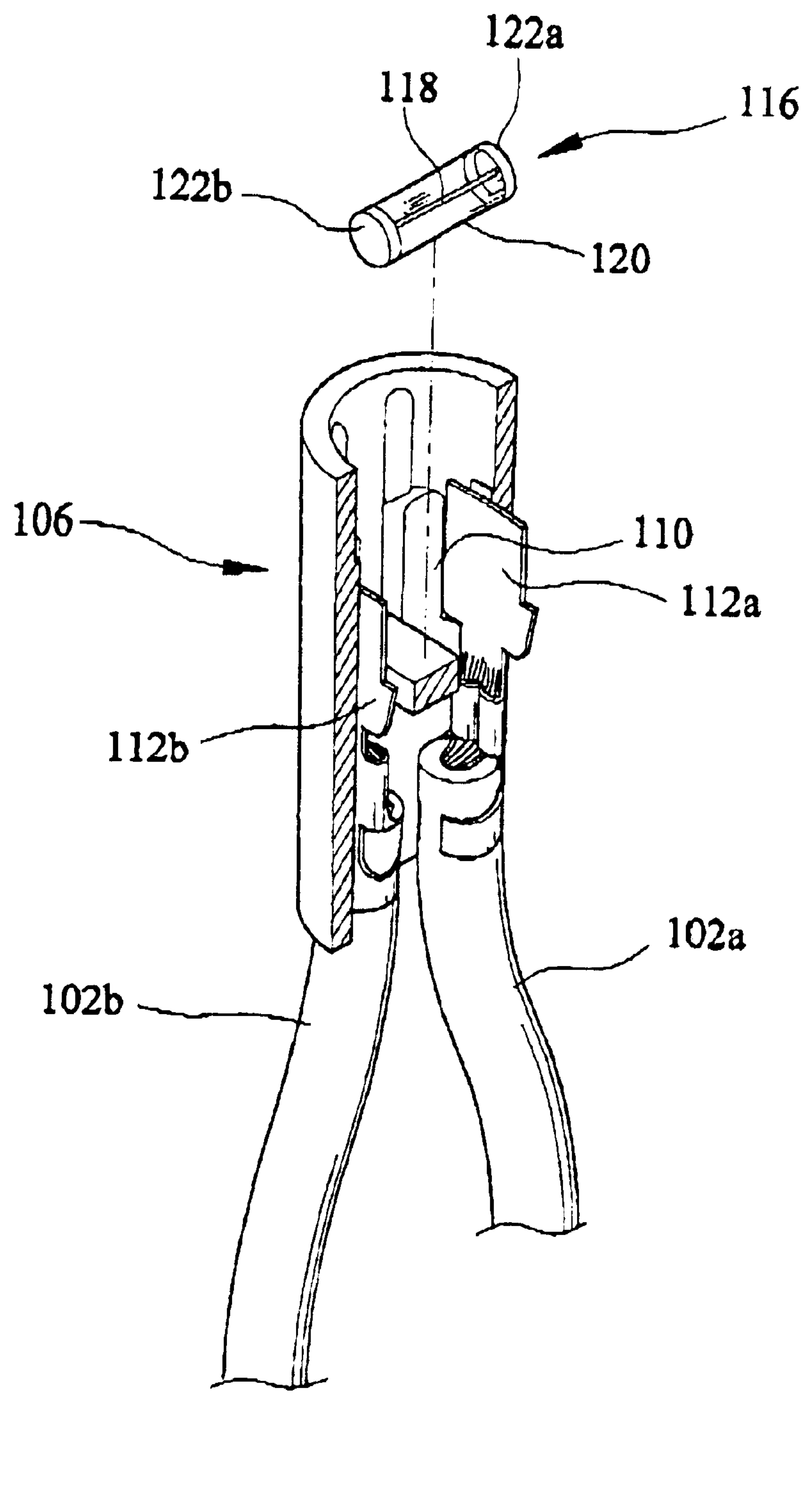
FIG. 3 is a perspective view of a bulb socket with a shunt member in accordance with a first embodiment of the present invention detached therefrom.

Also referring to FIG. 3, in accordance with a first embodiment of the present invention, a shunt circuit is incorporated in each bulb socket 106. The shunt circuit comprises a shunt member 116 received in the receptacle 110. The shunt member 116 comprises an alumina wire 118 surrounded by an outer insulation sheath 120 with two ends 122*a* and 122*b*. The shunt member 116 is sized to be retained inside the socket 106 with the exposed ends 122*a* and 122*b* of the alumina wire 118 physically engaging the first and second contacts 112*a,* 112*b* of the socket 106. Thus, the shunt member 116 and the bulb 108 are connected in parallel with each other whereby when the bulb 108 malfunctions, such as burning out, electrical current from the wires 102 can continuously flow through the shunt member 116.

The reason that alumina is taken as the material for the alumina wire 118 is simply because, by properly shaping and sizing the alumina wire 118, the alumina wire 118 can provide a proper resistance that allows proper voltage drop, usually around 0.7 volts. Furthermore, alumina is a cheap and easily obtained material. Thus, costs can be reduced. Preferably, the shunt member 116 is removably received in the socket 106 for replacement and maintenance.

Figure 4:
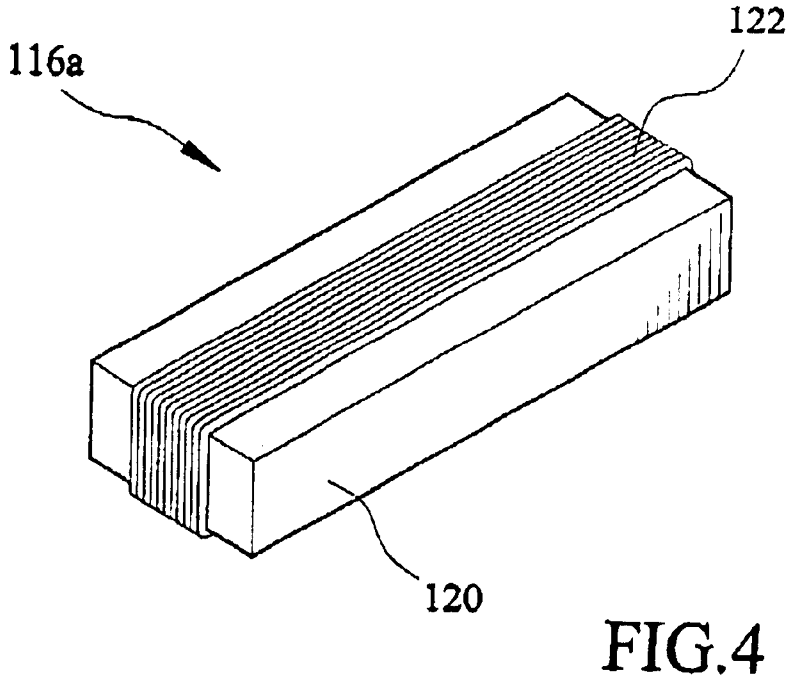
FIG. 4 is a perspective view of a shunt member in accordance with a second embodiment of the present invention.
Figure 5:
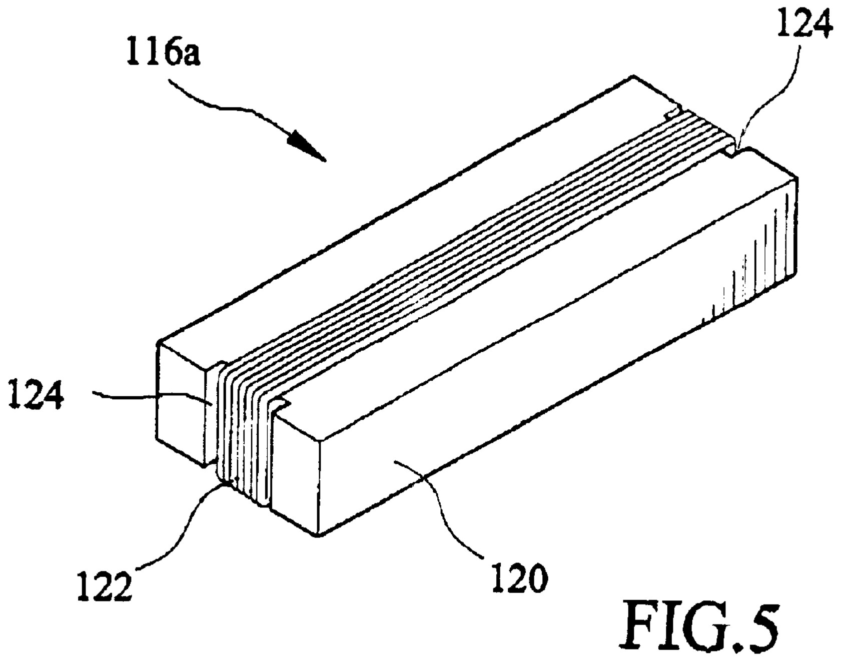
FIG. 5 is a perspective view of the shunt member of the second embodiment of the present invention, which further comprises slots.

FIGS. 4 and 5 show a shunt member constructed in accordance with a second embodiment of the present invention, generally designated with reference numeral 116*a* for distinction. The shunt member 116*a* comprises an insulation base 120 around which alumina wire 122 made of aluminum oxide or other suitable material that has electrical characteristics similar to that of aluminum oxide as discussed above are wound. To ensure secure retention of the alumina wire 122 on the base 120, slots 124 are defined in opposite ends of the insulation base 120 for partially receiving the alumina wire 122 therein. Similarly, the shunt member 116*a* is received in the socket 106 with opposite ends of the wound alumina wire 122 in physical engagement with the first and second contacts 112*a,* 112*b* of the socket 106 to form a shunt circuit for the bulb 108 received in the receptacle 110 of the socket 106.

Figure 6:
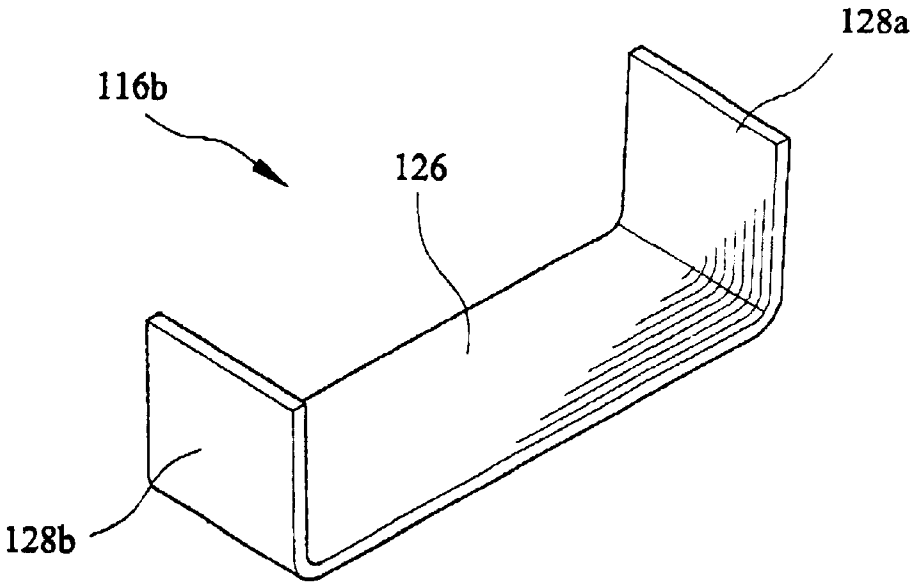
FIG. 6 is a perspective view of a shunt member in accordance with a third embodiment of the present invention.

FIG. 6 shows a shunt member constructed in accordance with a third embodiment of the present invention, generally designated with reference numeral 116*b* for distinction. The shunt member 116*b* comprises a central section 126 and two leg sections 128*a* and 128*b* extending from opposite ends of the central section 126, forming a U-shaped member. The shunt member 116*b* can be formed as a single unit with aluminum oxide or other suitable materials. Similarly, the shunt member 116*b* is received in the socket 106 with opposite leg sections 128*a* and 128*b* in physical engagement with the first and second contacts 112*a,* 112*b* of the socket 106 to form a shunt circuit for the bulb 108 received in the receptacle 110 of the socket 106.

Figure 7:
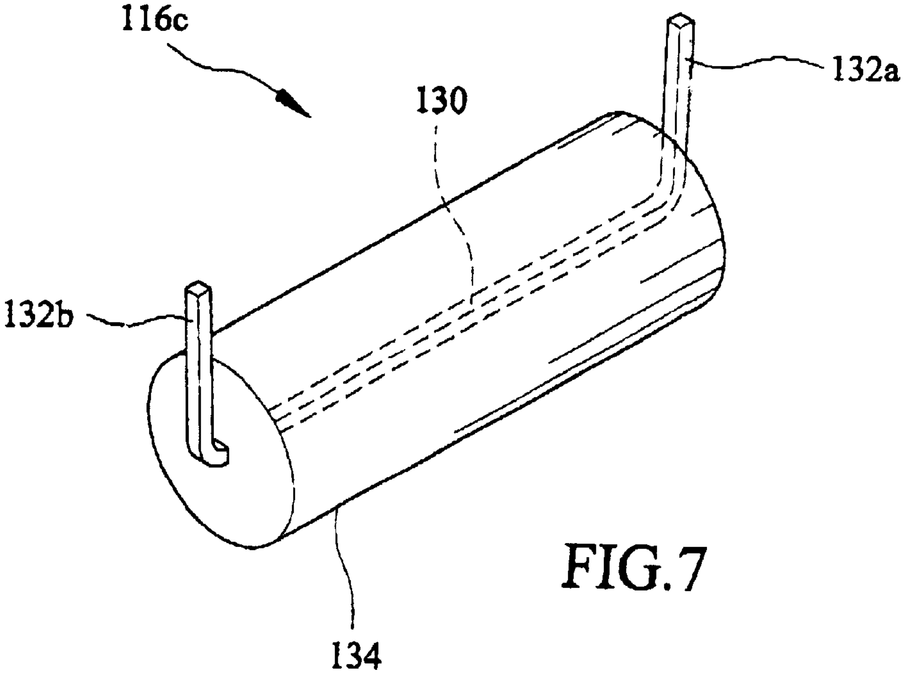
FIG. 7 is a perspective view of a shunt member in accordance with a fourth embodiment of the present invention.

FIG. 7 shows a shut member constructed in accordance with a fourth embodiment of the present invention, generally designated with reference numeral 116*c* for distinction. The shunt member 116*c* is a modification of the shunt member 116*b* with reference to FIG. 6 and the shunt member 116*c* has a structure similar to that of the shunt member 116*b*. Thus, the shunt member 116*c* comprises a central section 130 and two leg sections 132*a* and 132*b* extending from opposite ends of the central section 130 to form a U-shaped. An insulation sheath 134 surrounds the central section 130. Similarly, the shunt member 116*c* is received in the socket 106 with opposite leg sections 132*a* and 1332*b* in physical engagement with the first and second contacts 112*a,* 112*b* of the socket 106 to form a shunt circuit for the bulb 108 received in the receptacle 110 of the socket 106.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A decorative bulb unit comprising:

a socket defining a receptacle for receiving and retaining a bulb having a filament, a first terminal and a second terminal;

a first contact mounted in the socket;

a second contact mounted in the socket and opposite to the first contact; and a shunt member removably mounted in the socket, the shunt member having opposite ends respectively engaging the first contact and the second contact and electrically connected with the filament of the bulb in parallel through the first terminal and the second terminal, the shunt member includes a wire made of alumina and having a predetermined resistance to provide a voltage drop of approximately 0.7 volts.

2. The decorative bulb unit as claimed in claim 1, wherein the alumina wire surrounded by an insulation sheath and has opposing ends releasably engaging the first contact and the second contact.

3. The decorative bulb unit as claimed in claim 1, wherein the shunt member includes an insulation block with the alumina wire wound around the insulation block, portions of the alumina wire adjacent opposite ends of the block respectively being in physical releasable engagement with the first contact and the second contact.

4. The decorative bulb unit as claimed in claim 3, wherein each of the opposite ends of the block has a slot formed therein for partially receiving and retaining a corresponding one of the portions of the alumina wire.

5. The decorative bulb unit as claimed in claim 1, wherein the alumina wire has a central section and two legs extending from opposite ends of the central section to form a U-shaped member, the two legs respectively physically releasable engaging the first contact and the second contact.

6. The decorative bulb unit as claimed in claim 5, wherein the shunt member includes an insulation sheath surrounding the central section of the alumina wire.

* * * * *